(12) United States Patent
Olliphant et al.

(10) Patent No.: US 8,768,828 B2
(45) Date of Patent: Jul. 1, 2014

(54) METHOD AND APPARATUS FOR PROCESSING ON-LINE DONATIONS

(75) Inventors: Hugo Olliphant, San Francisco, CA (US); Deborah Yee-Ky Liu, Santa Clara, CA (US); Su-I Lu, Mountain View, CA (US); Ernest Mak, Cupertino, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 11/962,302

(22) Filed: Dec. 21, 2007

(65) Prior Publication Data

US 2008/0249818 A1  Oct. 9, 2008

Related U.S. Application Data

(60) Provisional application No. 60/909,925, filed on Apr. 3, 2007.

(51) Int. Cl.
*G06Q 20/10* (2012.01)

(52) U.S. Cl.
USPC .......................................................... 705/39

(58) Field of Classification Search
CPC ..................................................... G06Q 20/10
USPC .............................................................. 705/39
See application file for complete search history.

(56) References Cited

U.S. PATENT DOCUMENTS

| | | | | |
|---|---|---|---|---|
| 5,757,917 A | * | 5/1998 | Rose et al. | 705/79 |
| 5,826,241 A | * | 10/1998 | Stein et al. | 705/26 |
| 6,330,575 B1 | * | 12/2001 | Moore et al. | 715/234 |
| 7,356,507 B2 | * | 4/2008 | Bezos et al. | 705/40 |
| 7,542,943 B2 | * | 6/2009 | Caplan et al. | 705/40 |
| 2002/0016765 A1 | * | 2/2002 | Sacks | 705/39 |
| 2002/0029179 A1 | * | 3/2002 | Gruber et al. | 705/35 |
| 2002/0049816 A1 | * | 4/2002 | Costin et al. | 709/206 |
| 2002/0073026 A1 | * | 6/2002 | Gruber et al. | 705/39 |
| 2002/0152163 A1 | * | 10/2002 | Bezos et al. | 705/40 |
| 2006/0212390 A1 | * | 9/2006 | Gruber | 705/40 |
| 2008/0098325 A1 | * | 4/2008 | Williams et al. | 715/781 |
| 2008/0243693 A1 | * | 10/2008 | Thrasher et al. | 705/51 |

OTHER PUBLICATIONS

Hoffman, Allan, "Paying Pals Keep Free Web Sites Going," Jun. 18, 2003, New House News Service, p. 1.*

* cited by examiner

*Primary Examiner* — Lindsay M. Maguire
(74) *Attorney, Agent, or Firm* — Schwegman, Lundberg & Woessner, P.A.

(57) ABSTRACT

A computer-implemented method and apparatus for processing on-line donations is disclosed. An example embodiment includes elements to generate a donation badge for display on a web page; link the donation badge with an account on a payment site; receive a donation from a donor via the donation badge; and credit the donation to the account linked to the donation badge.

13 Claims, 5 Drawing Sheets

FIG. 4

METHOD AND APPARATUS FOR PROCESSING ON-LINE DONATIONS

CROSS-REFERENCE TO PRIORITY PATENT APPLICATIONS

This patent application claims the benefit of the filing date of U.S. Provisional Patent Application Ser. No. 60/909,925, filed Apr. 3, 2007, and entitled, "Donation System".

BACKGROUND

1. Technical Field

This application relates to a method and system to process data. Particularly, this application relates to the processing of on-line donations.

2. Related Art

A number of organizations exist for the purpose of charitable and/or non-profit functions, including organizations which qualify as charitable organizations under U.S. Internal Revenue Service (IRS) Regulation 501(c)(3). Not uncommonly, such organizations find that there are a number of costs associated with receiving and handling donations. One cost involves the labor or man-power costs associated with soliciting and/or receiving such donations. Many charitable organizations employ or hire individuals or organizations for the purpose of soliciting funds, attracting potential donors and the like. Because there are often costs associated with such employees or organizations (including wages, salaries or commissions and/or costs of advertising services or materials, typically a certain portion of the funds received or collected by a charitable organization, which might otherwise be available for the organizations' charitable functions, must instead be expended for costs associated with attracting or receiving donations.

Another cost typically associated with or born by charitable organizations is the cost of handling the donated funds. In many situations, donations take the form of coins, currency, and/or negotiable instruments such as personal checks. Partially in situations where the charitable organization receives a relatively large number of donations in relatively small amounts, the costs associated with handling such coins, cash or checks, (such as costs of counting and/or rolling or packaging coins, counting cash and/or checks, and depositing these items in a financial institution) further depletes funds of the charitable organization.

Yet another cost sometimes associated with charitable transactions is the cost associated with providing receipts to donors, particularly receipts of a type that may be used by donors in calculating taxes or completing or documenting tax returns.

Donors to charitable organizations are sometimes solicited for donations in situations where the donors are presented with a single choice: to donate or not to donate to a single, particular charitable organization. Accordingly, it would be useful to provide an apparatus and method in which potential donors are presented with a number of different options for the recipient of their donation.

In a number of situations, a person wishing to make a donation to a particular charitable institution is required to either be in possession of a donation form and/or an address for other information so that the donation may be transmitted to the correct recipient. Also, donors often must bear the cost of postage or telephone calls. This situation is particularly problematic for donors who may have relocated, temporally or permanently, to a location far removed from the desired charitable organization.

U.S. Pat. No. 5,909,794 describes a donation transaction apparatus and method for facilitating donations to charitable organizations. The apparatus is configured to receive coins or, in some embodiments, cash or funds transfer authorization or credit charges, and preferably dispenses a donation receipt to the user which the user may use to prepare or document income tax returns. Preferably, the user is able to select among a plurality of charitable organizations to receive the donation.

Thus, a computer-implemented method and apparatus for processing on-line donations is needed.

BRIEF DESCRIPTION OF THE DRAWINGS

Embodiments illustrated by way of example and not limitation in the figures of the accompanying drawings, in which:

FIGS. 4-5 illustrate an example embodiment of a user interface for creating and customizing a donation badge.

DETAILED DESCRIPTION

In the following description, for purposes of explanation, numerous specific details are set forth in order to provide a thorough understanding of some example embodiments. It will be evident, however, to one of ordinary skill in the art that the various embodiments may be practiced without these specific details.

According to various example embodiments described herein, there is described a computer-implemented method and apparatus for processing on-line donations. In an example embodiment, donation or giving functionality can be implemented on a publication system (e.g., a blog system, a community forum system, a bulletin board system, a forms system, a network-based social network system, such as MYSPACE.COM, or a network-based marketplace, such as EBAY.COM or any other system via which a user may publish information on a network (e.g., the Internet), with the support of a payments or financial system (e.g., a networked banking system or payment system, e.g. PAYPAL.COM).

Figure 5:
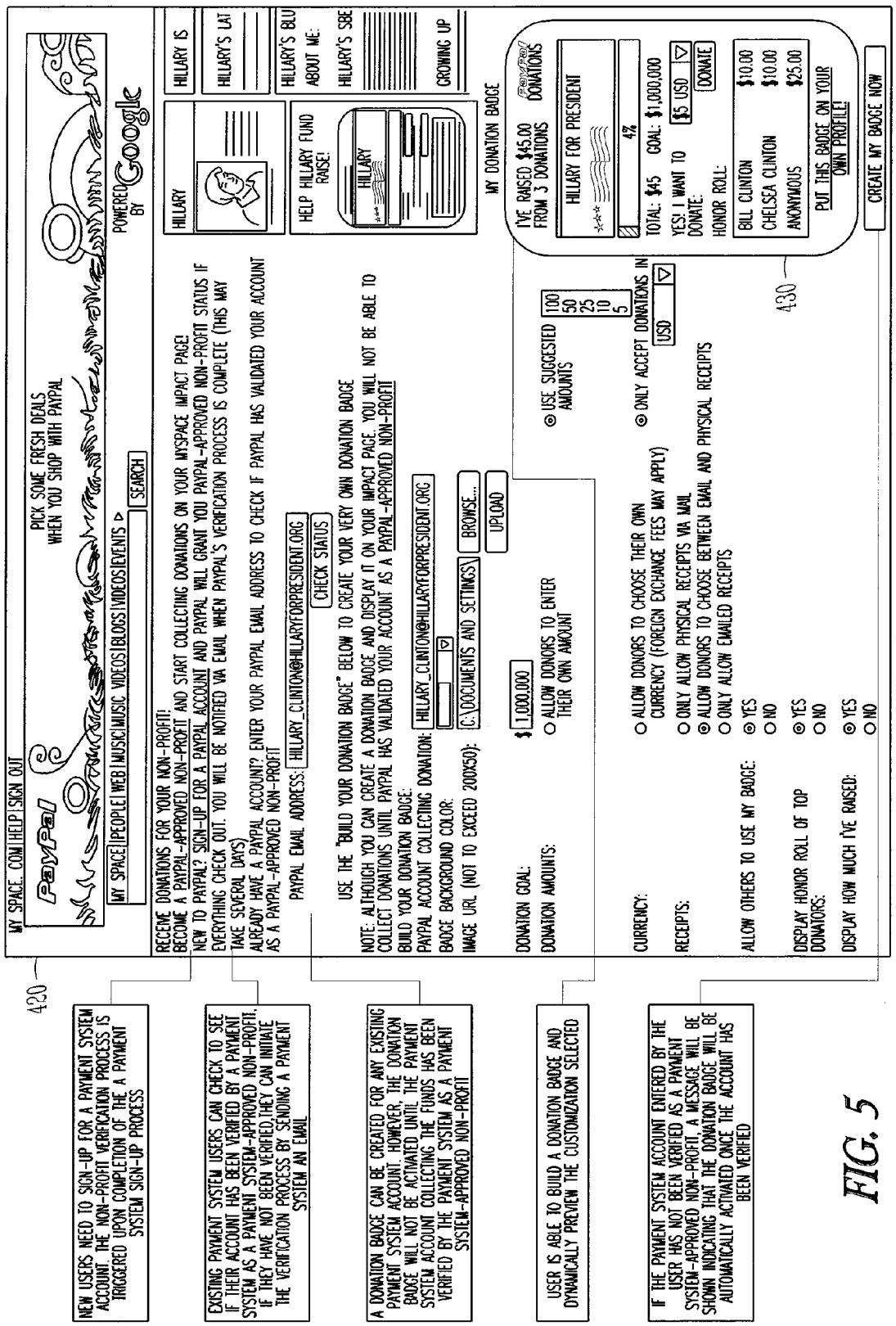

Various embodiments relate to fund raising and charities. Fund raising and charity can be considered to include different types of donations. Charity qualifies for reporting on an IRS Form 50123, while fund raising includes, for example, raising money for a soccer team to fund a trip. Various embodiments relate to allowing a user to set up functionality to track donations through a payment system (e.g. PayPal) backend for currently operative 'donate now' buttons or badges. In an example embodiment, the functionality is provided through a badge built in, for example, Flash that is tied to a user's payment system (e.g. PayPal) account. An example of a badge 430 in an example embodiment is shown in FIGS. 4 and 5.

Figure 4:
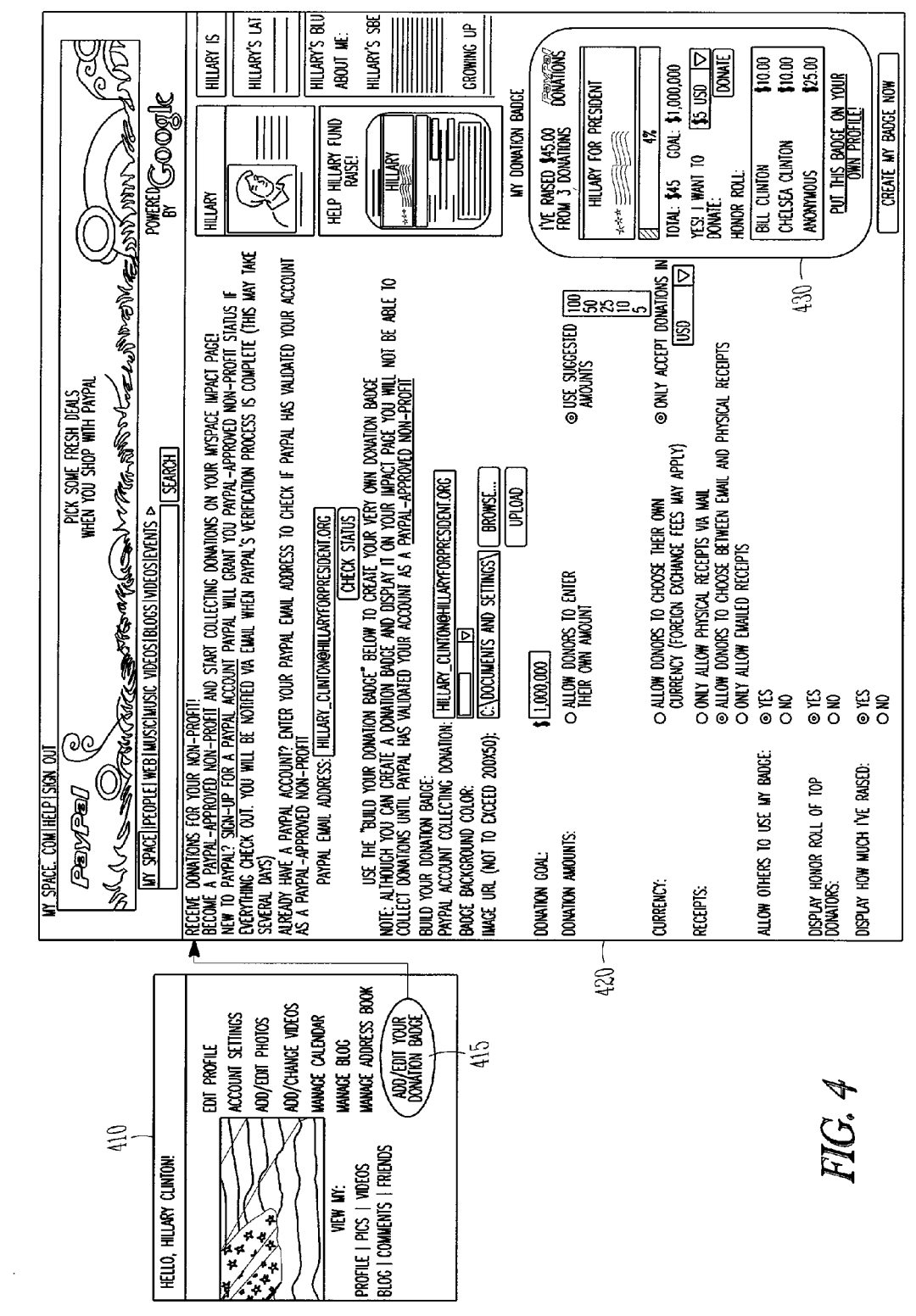

FIG. 4 illustrates a publisher site page 410 that includes a button 415 with which a user can create or configure a donation badge 430 using a page 420. Page 420 includes various options for building or configuring a donation badge. These options can include, an account identifier that links the badge to a payment system account that will receive funds donated via the badge; a badge color and associated image; a donation amount selection type; a currency type, a receipt process; and other options for customizing a donation badge for a particular purpose. As shown in FIG. 5, users can have their accounts and charity validated for the donation process. Once the user's account and charity is validated, the created and configured donation badge 430 can be activated and used by the user.

The badges are preferably made secure so that the recipient account is protected from being changed by someone other than the account owner. Donation level goals may be established through the badge.

Further, the donation badge may provide a mechanism whereby a user can conveniently import a version of the donation badge to his or her publication page (e.g., MYSPACE page). Such a badge, which is instantiated from a particular badge, is regarded as being "child" badge of the particular parent badge.

A parent badge can be used to spread children badges over web pages on the Internet when a user "grabs" a badge they want to spread around. A badge may be grabbed by selecting the badge and causing the copying of HTML code from a web page. Instead of copying the HTML code, a badge may be dragged and dropped to a pre-determined area on a web page to create a child badge.

A user who has posted a child badge on a web page may not have the same rights with respect to code within the badge as a user who posted the parent badge. In an example embodiment, a user who has posted a child badge may be allowed to edit text displayed by the badge, but not allowed to alter administrative functions linked to the badge. In an example embodiment, certain web site administrators may be given master administration rights to all the badges that are created on their site. In some example embodiments, a charity organization posting the badge may be allowed to customize a parent badge and some of the children badges would be allowed to be similarly customized. For example, someone who has posted a child badge may be allowed to change the title or to post or change a comment displayed by the badge. In each case, the money collected by the parent and child badges goes to the user who posted the badge (e.g. the user who sells the badge); because each of the badges are securely linked to the posting user's account in the payment system.

The payment system (e.g. PayPal) backend can provide validation for the charity represented by a particular badge. For example, the payment system can validate a charity represented by a particular badge for a year. In addition, the payment system backend may track how much money is generated by each badge. In an example embodiment, a parent badge is posted on a Red Cross site where five people grab the badge from the Red Cross site and post the linked children badges on one or more other sites. Other people can grab the posted badges from those sites and post the badges on other sites. In this manner, a collection of badges can spread throughout a number of sites. The payment system can track how much money is raised from each badge and each corresponding child badge because each badge is linked to the payment site. Thus, the influence each badge has had can be determined. Because the linked children badges can be spread, a parent badge that does not itself generate many donations can still have a high level of influence on overall donations.

In an example embodiment, distributed badges create a giving tree. The giving tree presents a visual representation of the hierarchy of related badges. Thus, users may be able to see the whole tree, mouseover all of the badges and compare their income and position in the hierarchy.

In an example embodiment, the badge can be distributed via email to another user who may be invited to post the badge in order to collect donations.

In an example embodiment, the badges may solicit donations in the form of an item or items on a wish list. For example, a badge may prompt a user (donor) to select for donation items such as basketballs, jerseys, or sneakers for an inner city school, for example. In an example embodiment, one badge soliciting three items (e.g. basketballs, jerseys, and sneakers) may be grabbed and posted as a child badge soliciting one item (e.g. sneakers).

In another example embodiment, a badge, as described above, can be used to facilitate enforcement of political fundraising regulations promulgated by the Federal Elections Commission (FEC). The idea is to provide functionality for tracking contributions made via widgets and electronic transactions so that contribution totals regulations can be more easily and efficiently enforced. In an example embodiment, a Flash application, for example, can prompt users (contributors) to respond to questions related to the FEC requirements. For example, the contributor can be asked: (1) are you a US citizen or permanent resident; (2) are you donating personal funds not business funds, etc. Example fundraising badges may incorporate all the FEC requirements through drag and drop functionality or by cut and pasting HTML code. The political fundraising implementation for a particular embodiment can be implemented as a particular version of the charity badge described herein.

In an example embodiment (e.g., a Flash page), a user is prompted to respond to a series of questions used to determine through a user's self disclosure whether the Federal Election Commission (FEC) regulations will apply to the user. For example, the user can be asked: are you a non-profit qualifying for IRS 50123 status? Are you a political campaign? Or are you an individual fundraising not qualifying for IRS 50123. Based on the results, the user is given a badge with or without the built in FEC regulation functionality. The badge can be a completely packaged, FEC compliant badge used for soliciting political contributions.

While the example embodiment describes separate and distinct social networking and payment systems, as examples of publication and financial systems, it will be appreciated that the described functionality may of course be implemented within the confines of a single system.

As described herein, a social networking system may be an attractive venue for entities looking to raise funds (e.g., charities or political candidates). Social synergies and word of mouth campaigning within the context of a social networking system may provide highly targeted and demographic appropriate fundraising opportunities.

In an example embodiment, a donation contribution function, in the example form of a "donation badge" function, is integrated into a publication system (e.g., a social networking system). A donation badge may be associated with (e.g. linked to) an account, provided by payment system (e.g. PayPal), to collect donated funds. In an example embodiment, the donation badge is not activated until the receiving account is validated as being controlled and/or owned by an approved non-profit entity.

A donation badge, as displayed on a publication page (e.g., a MYSPACE page of the user), may provide certain interactive and incentive information to users. For example, a percentage indication of progress towards a total fund collection goal for the relevant account may be provided. This percentage application may take into account contributions received through an original badge, as well as any child badges associate therewith. A particular badge may also provide an individual badge contribution indication, displaying a value that has been raised through the individual badge. This is different from a "total" donation meter, which shows total amounts raised from all distributed badge donations.

Further, the donation badge may provide a convenient interface to the payment system, using which a user can make a donation from a user account, also potentially maintained with the payment system, to an account associated with the approved non-profit entity. A "donation amount" feature within a badge may allow users to enter a donation amount, or select from a list of suggested amounts. Further, the badge may specify certain accepted currencies, or allowed a user to make a donation in any currency.

The donation badge may also display an "honor roll", in which users that have made and originated significant contributions (e.g., in excess of a predetermined threshold) via the relevant badge (or any related badges) may be a displayed in a ranked order. In one example, the honor roll may attribute a "rollup" cumulative donation total of contributions made via a user's badge, and all child badges, to a user. Within the honor roll, this "rollup" cumulative donation total may be displayed adjacent the user's name, and the list of users presented in the honor roll may be ranked-based on the "rollup" cumulative donation total. In another example, the donation total may simply be donations received a through the user's badge, and may exclude donations received through child badges.

In order to track the distribution of badges, and also to maintain the relationships between badges, each badge may upon instantiation be allocated a unique identifier. A donations applications (described below) may create and relate identifiers in order to maintain relationships between badges. As such collection of badges may conceptually be viewed as forming a "giving tree", with the badges forming the nodes of the tree and the branches defining the relationships between the badges.

In addition, the recreation and the distribution of badges may be subjected to various vetting and validation options. For example, the e-mail address of a recipient, associated with a particular badge, may be validated upon each instantiation or distribution of a badge to ensure that the e-mail address is correct and associated with a verified nonprofit entity (e.g., a verified recipient of donations). This vetting and validation may reduce the potential for fraud which may be attempted by the association of an unvetted e-mail address with an instantiation of a badge.

One example embodiment also includes a "giving tree", which provides a graphical representation of a category structure or tree of badges spawned from an initial (or original) badge created by or for an approved nonprofit receiving entity. The graphical representation may display a node for each badge, along with the amounts badge has both directly and indirectly (e.g., through child badges) contributed to the donation campaign via the relevant badge. To this end, and in the same way as described above with respect to the honor roll, a donation application may attribute a "rollup" cumulative donation total of contributions made via particular badge, and all child badges, to the relevant badge. This rollup" cumulative donation total may be a displayed adjacent in a node for the badge in the giving tree. In another example, the donation total may simply be donations received a through the relevant badge, and may exclude donations received through child badges.

Details of an example publication system and of an example payment system are described below with reference to FIGS. 1-3. In an example embodiment, the functions described herein, may be supported by the described systems.

Figure 1:
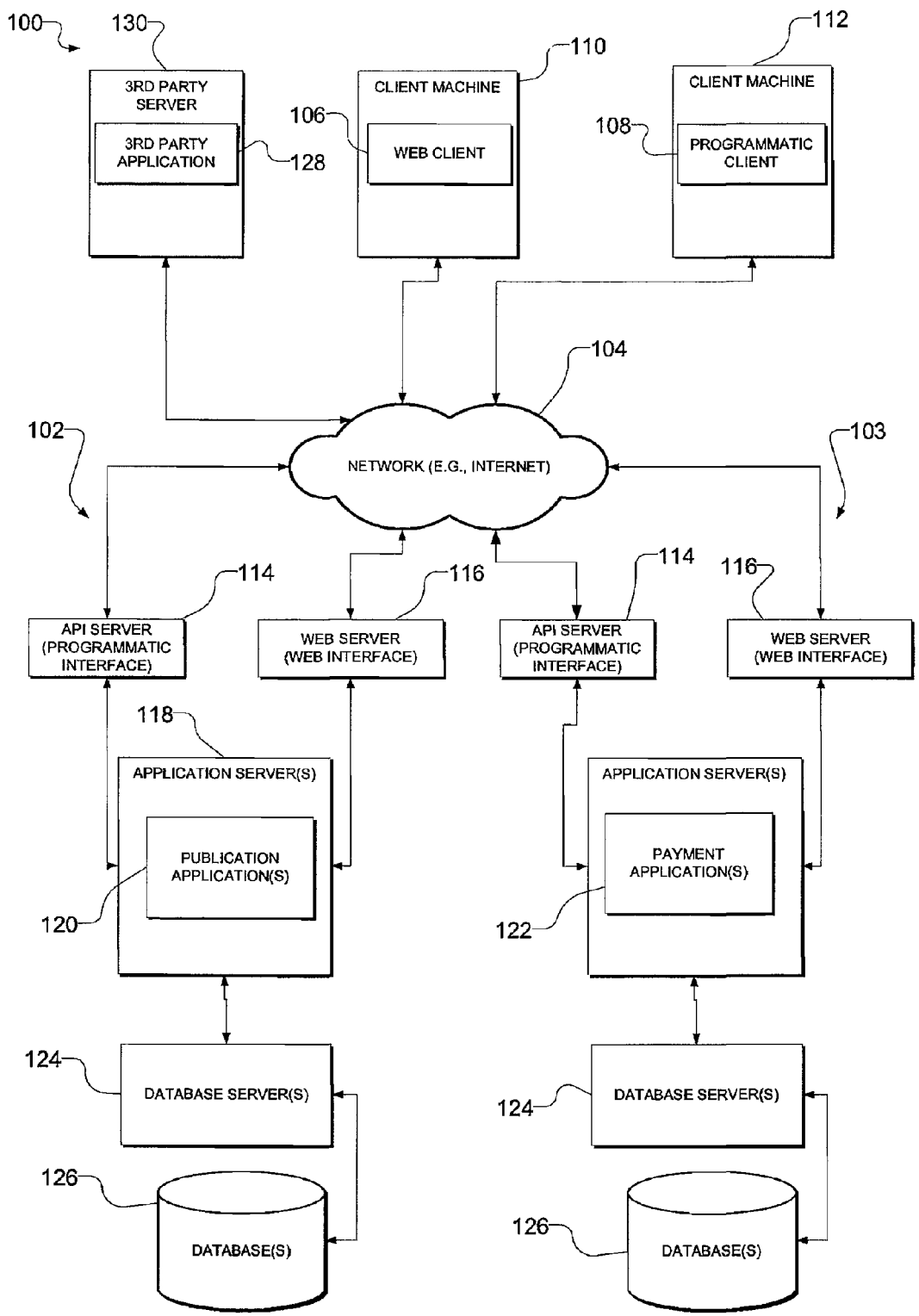
FIG. 1 illustrates an example embodiment of a networked system in which various embodiments may operate.

FIG. 1 is a network diagram depicting a client-server system, designated generally as 100, within which one example embodiment may be deployed. The system 100 may include any number of network systems, including a networked publication system 102 (e.g., a network-based social networking system or a network-based marketplace) and a networked payment system 103. Each of the systems 102 and 103 may provides server-side functionality, via a network 104 (e.g., the Internet or Wide Area Network (WAN)) to one or more clients. FIG. 1 illustrates, for example, a web client 106 (e.g., a browser, such as the INTERNET EXPLORER browser developed by Microsoft Corporation of Redmond, Wash. State), and a programmatic client 108 executing on respective client machines 110 and 112.

Dealing with the infrastructure of the networked publication system 102 as an example, an Application Program Interface (API) server 114 and a web server 116 are coupled to, and provide programmatic and web interfaces respectively to, one or more application servers 118. The application servers 118 host one or more publication applications 120 (e.g., marketplace or social networking applications). The application servers 118 are, in turn, shown to be coupled to one or more database servers 124 that facilitate access to one or more databases 126. Similarly, application servers of the payment system 103 may host payment applications 122.

The publication applications 120 may provide a number of publication functions and services to users that access the publication system 102. The payment applications 122 of the payment system 103 may likewise provide a number of payment services and functions to users. The payment applications 122 may for example allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120.

While the system 100 shown in FIG. 1 employs a client-server architecture, embodiments are of course not limited to such an architecture, and could equally well find application in a distributed, or peer-to-peer, architecture system, for example. The various publication and payment applications 120 and 122 could also be implemented as standalone software programs, which do not necessarily have networking capabilities.

The web client 106 accesses the various publication and payment applications 120 and 122 via the web interfaces supported by the web servers 116. Similarly, the programmatic client 108 accesses the various services and functions provided by the publication and payment applications 120 and 122 via the programmatic interface provided by the respective API servers 114. The programmatic client 108 may, for example, be a publication application (e.g., the TurboLister application developed by EBAY Inc., of San Jose, Calif.) to enable sellers to author and manage documents (e.g., listings) on the publication system 102 in an off-line manner, and to perform batch-mode communications between the programmatic client 108 and the publication system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the publication system 102 or from the payment system 103, support one or more features or functions on a website hosted by the third party. The third party website may, for example, provide one or more publication or payment functions that are supported by the relevant applications 120 and 122.

Figure 2:
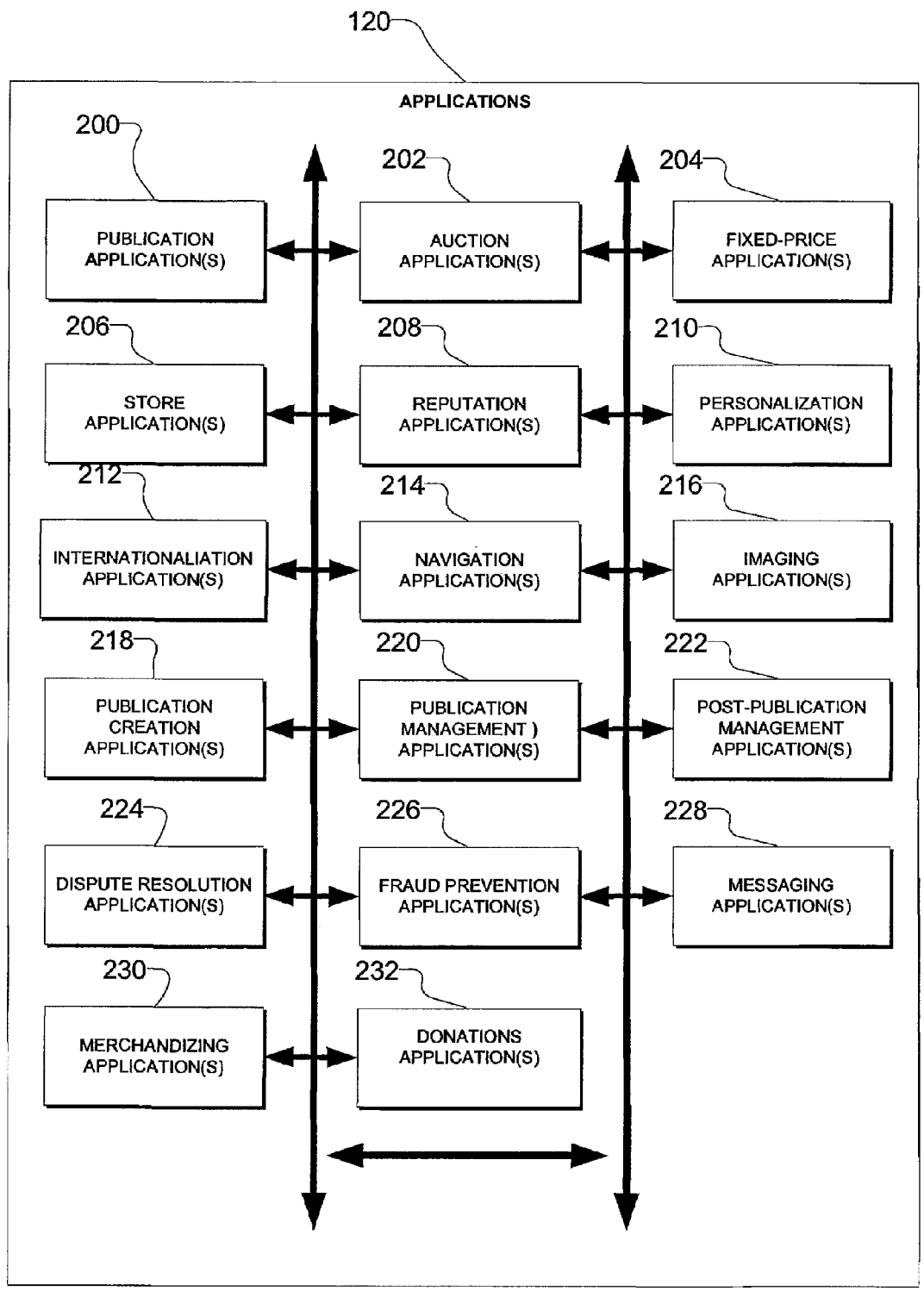
FIG. 2 is a block diagram illustrating multiple publication applications that, in one example embodiment, can be provided as part of a publication system.

FIG. 2 is a block diagram illustrating multiple publication applications 120 that, in one example embodiment, can be provided as part of the publication system 102. The publication applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 128.

The networked system 102 may provide a number of publishing, listing and price-setting mechanisms whereby a user may publish information (e.g., concerning him or herself and his or her interests, or goods or services for sale). Further, a user can express interest in the published information. Where the publication system 102 supports a social networking function, a user may express a social interest in the published information and the author thereof. Where the publication system supports a network-based marketplace function, for example, a buyer can express interest in or indicate a desire to purchase such goods or services, and a price can be set for a transaction pertaining to the goods or services. A donor can also express interest in or indicate a desire to donate money, goods or services, and a price can be set for a transaction pertaining to the donated money, goods or services.

The publication applications 120 may include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by EBAY Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of web sites that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Publication creation applications 218 allow users to conveniently also contend for publication via the publication system 102. For example, a user of a social networking site may conveniently be provided with templates, using which the user may author a personal profile and create links to contend that reflects the user's interests. In another example, sellers may be enabled conveniently to author listings pertaining to goods or services that they wish to transact via the networked system 102, and publication management applications 220 allow sellers to manage such publications. In one example, where a particular seller has authored and/or published a large number of listings, the management of such listings may present a challenge. The publication management applications 220 provide a number of features (e.g., auto-relisting, inventory level monitors, etc.) to assist the seller in managing such listings. One or more post-publication management applications 222 also assist sellers with a number of activities that typically occur post-listing. For example, upon completion of an auction facilitated by one or more auction applications 202, a seller may wish to leave feedback regarding a particular buyer. To this end, a post-publication management application 222 may provide an interface to one or more reputation applications 208, so as to allow the seller conveniently to provide feedback regarding multiple buyers to the reputation applications 208.

Dispute resolution applications 224 provide mechanisms whereby disputes arising between users (e.g. transacting parties) may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within (or outside of) the publication system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The applications may also include a donation application 232, which include an account creation module, a nonprofit verification module, a badge tracking module, a donation amount tracking module, and a badge personalization module (not shown). These various modules may, in the various embodiments, be distributed between the publication system 102 and that the payment system 103. In an example embodiment, these modules are responsible for the performance of the various "donation badge" functions described herein.

Figure 3:
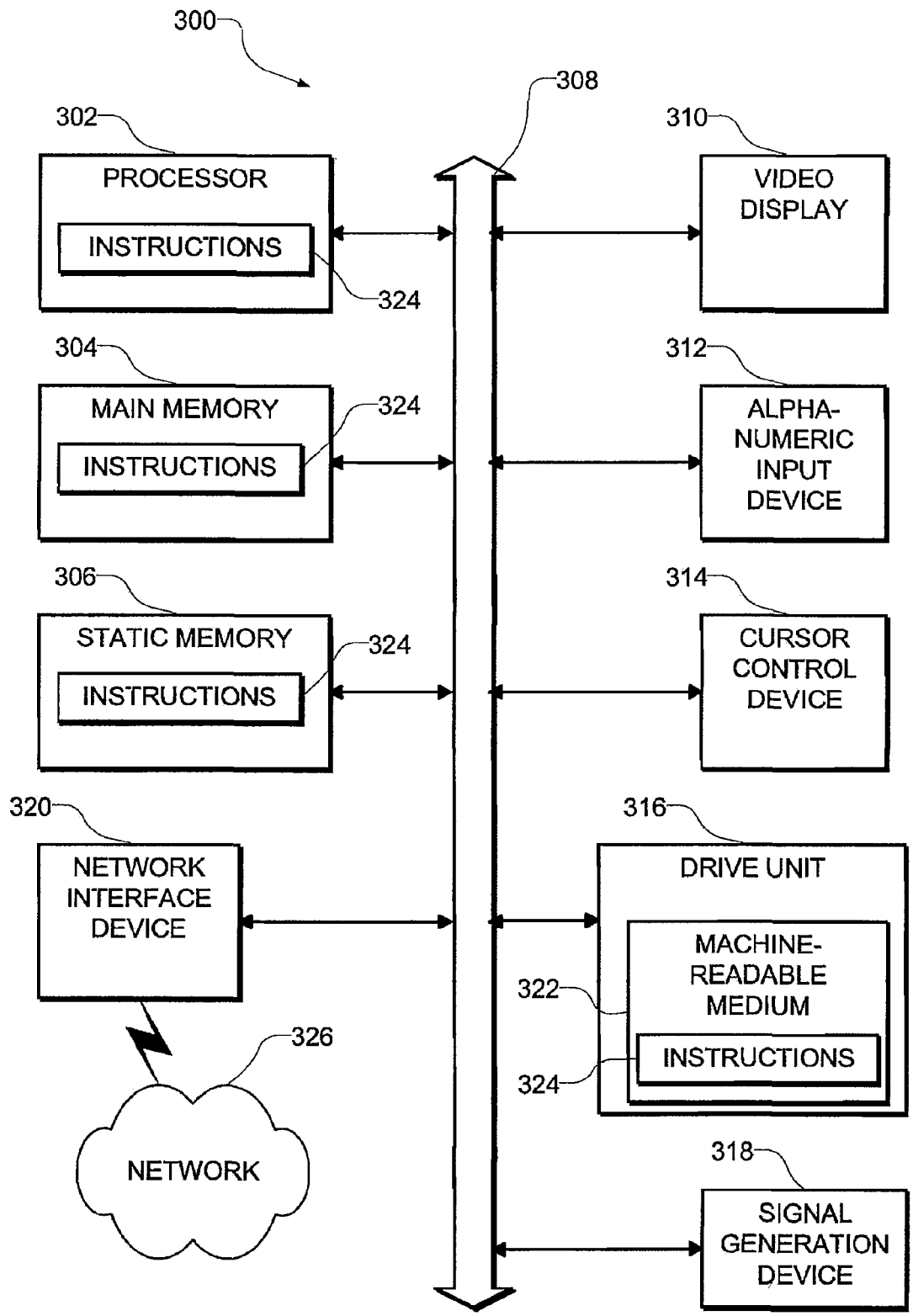
FIG. 3 shows a diagrammatic representation of a machine in the form of a computer system within which a set of instructions, for causing the machine to perform any one or more of the methodologies discussed herein, may be executed, according to an example embodiment.

FIG. 3 is a block diagram of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, embodiments may be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

The methods described herein may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above. It will be noted that, in an example embodiment, the processing logic may reside in any of the modules described herein.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, a computer-implemented method and apparatus for processing on-line donations is disclosed. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   generating, on a publisher site at a first server, a donation badge for display on a web page;
   providing a web interface for establishing network communications between the publisher site and a payment site;
   providing an application programming interface (API) for establishing programmatic network communications between the publisher site and the payment site;
   linking the donation badge with a receivables account on the payment site at a second server, the second server being different from and in network communication with the first server via the web interface or the API, the payment site being configured to collect donations from a plurality of publisher sites, the payment site being further configured to validate the receivables account on the payment site as being controlled or owned by an approved non-profit entity;
   creating multiple instantiations of the donation badge in child badges that are displayed on a plurality of web pages, the child badges having different modification rights than the donation badge, each child badge being linked to the receivables account on the payment site;

activating the donation badge if the donation badge is linked to an approved non-profit account that has been validated as being controlled or owned by an approved non-profit entity;

receiving a donation from a donor via the donation badge;

crediting the donation to the receivables account linked to the donation badge;

causing to be displayed a visual representation of a hierarchical structure of the donation badge and child badges created from the donation badge, wherein the visual representation of the hierarchical structure comprises a node for each donation badge and child badge; and causing to be displayed adjacent to each node in the hierarchical structure a total amount that has been donated via the donation badge or the child badge corresponding to the node.

2. The method as claimed in claim 1 wherein generating the donation badge includes providing a plurality of options associated with the donation badge.

3. The method as claimed in claim 1 including importing the donation badge into a plurality of web pages.

4. The method as claimed in claim 1 including selectively allowing only particular users to alter administrative functions linked to the donation badge.

5. The method as claimed in claim 1 including tracking the revenue collected via a particular donation badge.

6. The method as claimed in claim 1 including distributing the donation badge via email.

7. An article of manufacture comprising a non-transitory machine-readable storage medium having machine executable instructions embedded thereon, which when executed by a machine, cause the machine to:

generate, on a publisher site at a first server, a donation badge for display on a web page;

provide a web interface for establishing network communications between the publisher site and a payment site;

provide an application programming interface (API) for establishing programmatic network communications between the publisher site and the payment site;

link the donation badge with a receivables account on the payment site at a second server, the second server being different from and in network communication with the first server via the web interface or the API, the payment site being configured to collect donations from a plurality of publisher sites, the payment site being further configured to validate the receivables account on the payment site as being controlled or owned by an approved non-profit entity;

create multiple instantiations of the donation badge in child badges that are displayed on a plurality of web pages, the child badges having different modification rights than the donation badge, each child badge being linked to the receivables account on the payment site;

activate the donation badge if the donation badge is linked to an approved non-profit account that has been validated as being controlled or owned by an approved non-profit entity;

receive a donation from a donor via the donation badge;

credit the donation to the receivables account linked to the donation badge;

cause to be displayed a visual representation of a hierarchical structure of the donation badge and child badges created from the donation badge, wherein the visual representation of the hierarchical structure comprises a node for each donation badge and child badge; and cause to be displayed adjacent to each node in the hierarchical structure a total amount that has been donated via the donation badge or the child badge corresponding to the node.

8. The article of manufacture as claimed in claim 7 being operable to provide a plurality of options associated with the donation badge.

9. The article of manufacture as claimed in claim 7 being operable to import the donation badge into a plurality of web pages.

10. The article of manufacture as claimed in claim 7 being operable to selectively allow only particular users to alter administrative functions linked to the donation badge.

11. The article of manufacture as claimed in claim 7 being operable to track the revenue collected via a particular donation badge.

12. The article of manufacture as claimed in claim 7 being operable to distribute the donation badge via email.

13. A system comprising:
a processor;
a memory coupled to the processor to store information related to user donations;
a web interface for establishing network communications between a publisher site and a payment site;
an application programming interface (API) for establishing programmatic network communications between the publisher site and the payment site; and
a donation module to generate, on the publisher site at a first server, a donation badge for display on a web page, link the donation badge with a receivables account on the payment site at a second server, the second server being different from and in network communication with the first server via the web interface or the API, the payment site being configured to collect donations from a plurality of publisher sites, the payment site being further configured to validate the receivables account on the payment site as being controlled or owned by an approved non-profit entity, create multiple instantiations of the donation badge in child badges that are displayed on a plurality of web pages, the child badges having different modification rights than the donation badge, each child badge being linked to the receivables account on the payment site, activate the donation badge if the donation badge is linked to an approved non-profit account that has been validated as being controlled or owned by an approved non-profit entity, receive a donation from a donor via the donation badge, and credit the donation to the receivables account linked to the donation badge, the donation module being further configured to:

cause to be displayed a visual representation of a hierarchical structure of the donation badge and child badges created from the donation badge, wherein the visual representation of the hierarchical structure comprises a node for each donation badge and child badge; and cause to be displayed adjacent to each node in the hierarchical structure a total amount that has been donated via the donation badge or the child badge corresponding to the node.

* * * * *